United States Patent
Iida et al.

(10) Patent No.: US 6,412,532 B1
(45) Date of Patent: Jul. 2, 2002

(54) PNEUMATIC TIRE FOR AUTOMOBILE AND ITS FABRICATION METHOD

(75) Inventors: Eiichi Iida; Naoya Amino; Motohide Takasugi, all of Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 09/471,477

(22) Filed: Dec. 23, 1999

(30) Foreign Application Priority Data

Dec. 28, 1998 (JP) .......................... 10-374206

(51) Int. Cl.$^7$ ................ B29D 30/20; B29D 30/60; B60C 1/00; B60C 11/00
(52) U.S. Cl. ................... 152/209.5; 152/532; 156/130
(58) Field of Search .................. 152/209.5, 531, 152/532; 156/117, 130

(56) References Cited

U.S. PATENT DOCUMENTS

| | | | |
|---|---|---|---|
| RE25,349 E | * | 3/1963 | Hanson |
| 3,223,572 A | * | 12/1965 | Holloway et al. |
| 3,308,000 A | * | 3/1967 | Holman |
| 4,319,620 A | * | 3/1982 | Knill |
| 4,396,052 A | * | 8/1983 | Ahagon et al. |
| 4,407,347 A | * | 10/1983 | Mirtain |
| 4,635,693 A | * | 1/1987 | Ahagon et al. |
| 4,838,330 A | * | 6/1989 | Takayama |
| 5,046,542 A | * | 9/1991 | Ohta et al. |

FOREIGN PATENT DOCUMENTS

| | | | |
|---|---|---|---|
| EP | 873852 | * | 10/1998 |
| JP | 60-15203 | * | 1/1985 |
| JP | 5-246212 | * | 9/1993 |
| JP | 10-193475 | * | 7/1998 |
| JP | 10-323917 | * | 12/1998 |

* cited by examiner

*Primary Examiner*—Steven D. Maki
(74) *Attorney, Agent, or Firm*—Rader, Fishman & Grauer PLLC

(57) ABSTRACT

A pneumatic tire for an automobile having a tread portion in a two-layered structure of a cap tread layer and an under tread layer, in which the under tread layer is constituted by a center region defined by a range of 30 through 70% of a width of a first belt layer and up to 0.5 through 2.0 mm in a tire diameter direction from a second belt layer and a shoulder region extended from both end portions of the first belt layer continuously from the center region to an outer side by 30 mm at maximum on one side and having a thickness of 1.0 through 5.0 mm, the regions comprising rubber composition members different from each other, the center region is arranged with a rubber layer where JIS-A hardness falls in a range of 65 through 80 and an amount of blending a softening agent relative to rubber 100 weight parts is smaller than that of the cap tread layer by 10 weight parts or more, the shoulder region is arranged with a rubber layer where JIS-A hardness falls in a range of 50 through 70 and the amount of blending the softening agent relative to rubber 100 weight parts is smaller than that of the cap tread layer by 10 weight parts or more and a ratio (tan $\delta_2$/tan $\delta_1$) of loss tangent (tan $\delta_2$) of the rubber layer of the shoulder region to loss tangent (tan $\delta_1$) of the rubber layer of the center region is 2/3 or smaller.

7 Claims, 1 Drawing Sheet

PNEUMATIC TIRE FOR AUTOMOBILE AND ITS FABRICATION METHOD

BACKGROUND OF THE INVENTION

The present invention relates to a pneumatic tire for an automobile constituting a tread portion thereof by a two-layered structure of a cap tread layer and an under tread layer and its fabrication method, further particularly to a pneumatic tire for an automobile simultaneously achieving a reduction in rolling resistance and promotion of driving stability and its fabrication method.

Conventionally, in a pneumatic tire for an automobile, a tread portion is constituted by a two-layered structure of a cap tread layer disposed on an outer side in a tire diameter direction and an under tread layer disposed on an inner side in the tire diameter direction. As the under tread layer, with an object of promoting driving stability, a rubber layer having high hardness is used and with an object of reducing rolling resistance, a rubber layer having low heat generation performance is used. However, the under tread layer is provided with a function of protecting belt layers against oil migration by the cap tread layer (oil barrier function), an amount of blending a softening agent is comparatively small and accordingly, when a rubber layer having high hardness is used, it is inevitable that the under tread layer is necessarily provided with high heat generation performance.

Hence, in Japanese Patent Laid-Open No. 246212/1993, it is proposed that a rubber layer having high hardness of JIS-A hardness 70 through 80 is arranged at a center portion of an under tread layer with a width of 30 through 50% of the grounding width and a rubber layer having comparatively low hardness of JIS-A hardness 50 through 60 is arranged at a shoulder portion thereof to thereby reduce rolling resistance and at the same time to promote driving stability. However, there poses a problem in which according to the above-described method, the hardnesses of the rubber layers constituting the center portion and the shoulder portion are limited to narrow ranges and therefore, the tire function which can be set is restricted.

SUMMARY OF THE INVENTION

It is an object of the invention to provide a pneumatic tire for an automobile in which a tread portion is constituted by two-layered structure of a cap tread layer and an under tread layer and in achieving a reduction in rolling resistance and promotion of driving stability, conditions of setting thereof are alleviated.

In order to achieve the above-described object, according to an aspect of the invention, there is provided a pneumatic tire for an automobile in which two layers of belt layers including a first belt layer on a side of a carcass layer and a second belt layer on an outer peripheral side thereof are arranged on an outer peripheral side of the carcass layer in a tread portion and the tread portion comprises a two-layered structure of a cap tread layer and an under tread layer wherein the under tread layer is comprising a center region defined by a range of 30 through 70% of a width of the first tread layer centering on a tire equator and a range of 0.5 through 2.0 mm in a tire diameter direction from the second belt layer and a shoulder region defined by a region extended from both end portions of the first belt layer continuously from the center region to an outer side by 30 mm at a maximum on one side and a range of 1.0 through 5.0 mm as a thickness thereof, the center region and the shoulder region comprising rubber composition members different from each other, wherein the center region is arranged with a rubber layer having a blending system in which JIS-A hardness falls in a range of 65 through 80 and an amount of blending a softening agent relative to rubber 100 weight parts is smaller than a blending amount thereof of the cap tread layer by 10 weight parts or higher, the shoulder region is arranged with a rubber layer having a blending system in which the JIS-A hardness falls in a range of 50 through 70 and the amount of blending the softening agent relative to the rubber 100 weight parts is smaller than the blending amount of the cap tread layer by 10 weight parts or higher and a ratio (tan $\delta_2$/tan $\delta_1$) of loss tangent (tan $\delta_2$) of the rubber layer of the shoulder region to loss tangent (tan $\delta_1$) of the rubber layer of the center region is ⅔ or lower.

In this way, by properly arranging the rubber layer having high hardness to the center region and the rubber layer having low heat generation performance to the shoulder region as the under tread layers, a reduction in the rolling resistance and promotion of driving stability can simultaneously be achieved. Further, usable rubber composition members can be selected from a range wider than that in the conventional case and accordingly, desired tire function can be set.

According to the invention, the loss tangent (tan $\delta$) is measured by using a spectrometer for measuring dynamic viscoelasticity under conditions of temperature of 60° C., initial strain of 10%, dynamic strain of ±2% and frequency of 20 Hz.

In order to realize the above-described tread structure, it is conceivable to integrally extrude tread rubber distributed with a number of kinds of rubber composition members in a tire sectional direction by using an extruder. However, in order to extrude tread rubber all together, it is necessary to mount screws for the kinds of the rubber composition members and auxiliary extruding dies for approximating the tread structure to a shape as aimed at the extruder other than tread dies, it is extremely difficult to provide a desired sectional structure while controlling these, the auxiliary extruding dies for each product needs to prepare similar to the tread dies and accordingly, an increase in equipment investment results.

Further, the tread rubber comprising the extruded product fabricated as described above is provided with a drawback in which a bottom face thereof is liable not to be flat owing to a difference in shrinkage rates in cooling of the respective rubber composition members and an air storage is liable to cause in molding raw tire. It is conceivable as a countermeasure thereagainst to immediately supply the tread rubber to a molding cycle of raw tire without providing the cooling step by retarding the extruding speed to be synchronized with the molding cycle of raw tire. However, this is not regarded as a method preferable in view of quality and efficiency in consideration of a delay of cycle when mechanical failure is caused or an amount of producing failed extruded products before and after setup change.

Hence, according to another aspect of the invention, there is provided a method of fabricating a pneumatic tire for an automobile, the method comprising the steps of wrapping belt layers on an outer periphery of a forming drum and wrapping a strip member comprising an unvulcanized rubber composition member having a width of 5 through 30 mm and a thickness of 0.5 through 3.0 mm on an outer peripheral side of the belt layers in a tire circumferential direction while overlapping at least a portion thereof at every turn, wherein a kind of the unvulcanized rubber composition constituting the strip member is made to differ in accordance with a position of a tire meridian section to thereby form a tread portion having a multiple composition structure.

In this way, in forming the tread portion having the multiple composition structure, the strip member is wrapped in the tire circumferential direction while overlapping at least a portion thereof at every turn and the kind of the unvulcanized rubber composition member constituting the strip member is made to differ in accordance with the position of the tire meridian section to thereby efficiently fabricate the pneumatic tire for an automobile having the tread portion in the multiple composition structure excellent in homogeneous performance.

DETAILED DESCRIPTION OF THE PREFERRED EMBODIMENTS

Figure 1:
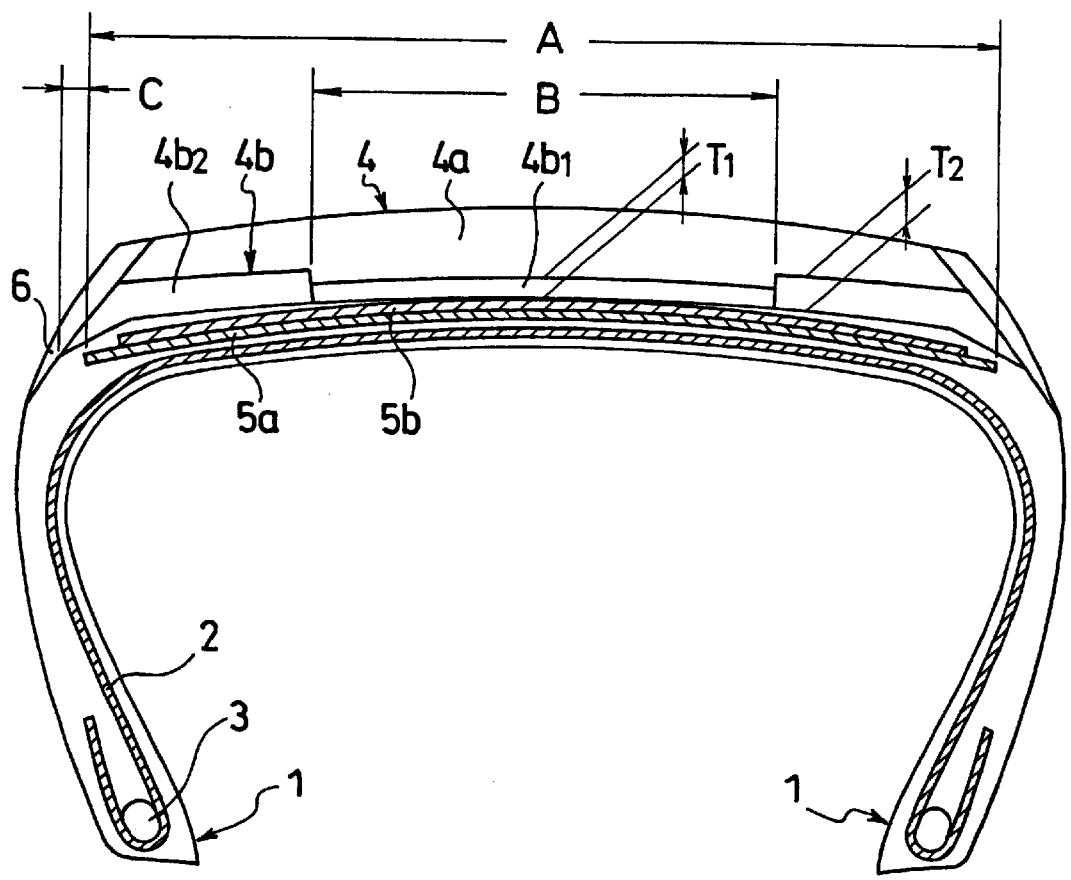
FIG. 1 is a meridian sectional view showing a pneumatic tire for an automobile constituting an embodiment of the invention.

FIG. 1 exemplifies a pneumatic tire for an automobile constituting an embodiment of the invention. In the drawing, a carcass layer 2 comprising a plurality of numbers of carcass codes is mounted between a pair of left and right bead portions 1 and both end portions in a tire width direction of the carcass layer 2 are wound from an inner side to an outer side of the tire respectively around bead cores 3.

On an outer peripheral side of the carcass layer 2 at a tread portion 4, there are provided two layers of belt layers 5a and 5b each comprising a plurality of reinforcement cords such as steel cords. The belt layers 5a and 5b are arranged such that the reinforcement cords are inclined to a tire circumferential direction and the reinforcement cords intersect with each other between the layers. Further, the width of the belt layer 5a is wider than the width of the belt layer 5b. Further, organic fiber reinforcement layers in which a cord angle relative to the tire circumferential direction becomes substantially 0 degree may be provided to cover at least both end portions of belt layers 5a and 5b, as necessary. Although organic fiber cords constituting such an organic fiber reinforcement layer are not particularly limited, it is preferable to use nylon cords having thermally shrinking performance.

The tread portion 4 is constituted by a two-layered structure of a cap tread layer 4a disposed on an outer side in the tire diameter direction and an under tread layer 4b disposed on an inner side of the tire diameter direction. A wing tip 6 comprising a rubber composition member is pasted on both end portions in a width direction of the tread portion 4 in a band-like shape. The rubber composition member of the cap tread layer 4a is not particularly limited. The cap tread layer 4a is constituted by a rubber layer having a blend system in which the JIS-A hardness falls in a range of 45 through 75 and an amount of blending a softening agent falls in a range of 10 through 60 weight parts relative to rubber 100 weight parts.

Meanwhile, the under tread layer 4b is constituted by rubber composition members which differ from each other in a center region and a shoulder region. The center region is prescribed by a range of a width B in correspondence with 30 through 70% of a width A of the first belt layer 5a and by a range of 0.5 through 2.0 mm of a thickness $T_1$ in a tire diameter direction from the second belt layer 5b. The shoulder region is extended from both end portions of the first belt layer 5a continuously from the center region to an outer side in the tire width direction and is prescribed by a range of a maximum projection amount C from the both end portions equal to or smaller than 30 mm on one side and by a range of a thickness $T_2$ thereof of 1.0 through 5.0 mm.

The center region of the under tread layer 4b is arranged with a rubber layer $4b_1$ having a blending system in which the JIS-A hardness falls in a range of 65 through 80, more preferably, 70 through 80 and an amount of blending a softening agent relative to rubber 100 weight parts is smaller than that of the cap tread layer 4a by 10 weight parts or more. The shoulder portion of the under tread layer 4b is arranged with a rubber layer $4b_2$ having a blending system in which the JIS-A hardness falls in a range of 50 through 70 and an amount of blending a softening agent relative to rubber 100 weight parts is smaller than that of cap tread layer 4a by 10 weight parts or more. Further, viscoelastic ratio (tan $\delta_2$/tan $\delta_1$) of loss tangent (tans) of the rubber layer $4b_2$ of the shoulder region to loss tangent (tan $\delta_1$) of the rubber layer $4b_1$ of the center region, is set to be equal to or smaller than 2/3.

The above-described rubber composition members can be adjusted by pertinently blending carbon black and process oil to rubber contents of natural rubber, styrene-butadiene copolymer rubber (SBR) or butadiene rubber (BR). Further, the rubber composition members can pertinently be blended with adding agents of stearic acid, a vulcanization promotor, an ageing preventive agent or sulphur.

As described above, by arranging the rubber layer $4b_1$ having high hardness at the center region of the under tread layer 4b, the rigidity of the tread portion can be increased and the driving stability can be promoted. On the other hand, by arranging the rubber layer $4b_1$ of low heat generation performance having small loss tangent (tan $\delta_2$) at the shoulder region of the under tread layer 4b, the rolling resistance can be reduced.

According to the invention, the JIS-A hardness of the rubber layer $4b_1$ arranged at the center region of the under tread layer 4b is made to fall in a range of 65 through 80. When the JIS-A hardness of the rubber layer $4b_1$ is excessively low, the effect of promoting the driving stability becomes insufficient. Further, the amount of blending a softening agent relative to rubber 100 weight parts of the rubber layer $4b_1$ is made smaller than that of the cap tread layer 4a by 10 weight parts or more. When the amount of blending a softening agent of the rubber layer $4b_1$ is excessively large, the oil barrier function as the under tread layer becomes insufficient.

Meanwhile, the JIS-A hardness of the rubber layer $4b_2$ arranged at the shoulder region of the under tread layer 4b is made to fall in a range of 50 through 70. When the JIS-A hardness of the rubber layer $4b_2$ is excessively high, the effect of reducing the rolling resistance becomes insufficient. Further, the amount of blending a softening agent relative to rubber 100 weight parts of the rubber layer $4b_2$ is made to be smaller than that of the cap tread layer 4a by 10 weight parts or more. When the amount of blending a softening agent of the rubber layer $4b_2$ is excessively large, the oil barrier function of the under tread layer becomes insufficient. Further, a ratio (tan $\delta_2$/tan $\delta_1$) of loss tangent (tan $\delta_2$) of the rubber layer $4b_2$ of the shoulder region as compared with loss tangent (tan $\delta_1$) of the rubber layer $4b_1$ of the center region, is made to be 2/3 or lower. When the viscoelastic ratio (tan $\delta_2$/tan $\delta_1$) exceeds 2/3, the effect of reducing the rolling resistance becomes insufficient. Further, a lower limit value of the viscoelastic ratio (tan $\delta_2$/tan $\delta_1$) may be 1/3.

Further, according to the invention, there also is achieved an effect in which usable rubber composition members can be selected from a range wider than a conventional range by pertinently setting dimensions of the center region and the shoulder region of the under tread layer 4b. Therefore, desired tire function can be set by using rubber compounds in accordance with the object.

The width B of the center region is made to fall in a range of 30 through 70% of the width A of the first belt layer 5a, preferably, 40 through 60%. When the width is excessively wide, the effect of reducing the rolling resistance becomes insufficient and conversely, when the width B is excessively narrow, the effect of promoting the driving stability becomes insufficient. Further, the thickness $T_1$ of the center region is made to fall in a range of 0.5 through 2.0 mm. When the thickness $T_1$ is excessively thin, the oil barrier function becomes insufficient and conversely, when the thickness $T_1$ is excessively thick, an increase in the weight results.

The shoulder regions are extended from the both end portions of the first belt layer 5a continuously from the center region to the outer side in the tire width direction and the maximum projection amount C from the both end portions is made to fall in a range of 30 mm or less on one side. It is not necessary to provide the oil barrier by making the maximum projection amount C exceed 30 mm. Further, the thickness $T_2$ of the shoulder region is made to fall in a range of 1.0 through 5.0 mm. When the thickness $T_2$ is excessively thin, the effect of reducing the rolling resistance becomes insufficient and conversely, when the thickness $T_2$ is excessively thick, an increase in the weight results. Further, it is preferable that the thickness $T_2$ of the shoulder region is made to be thicker than the thickness T of the center region. By making the thickness $T_2$ thicker than the thickness $T_1$, the effect of promoting the driving stability and the effect of reducing the rolling resistance can be made compatible with each other at a high level.

Figure 2:
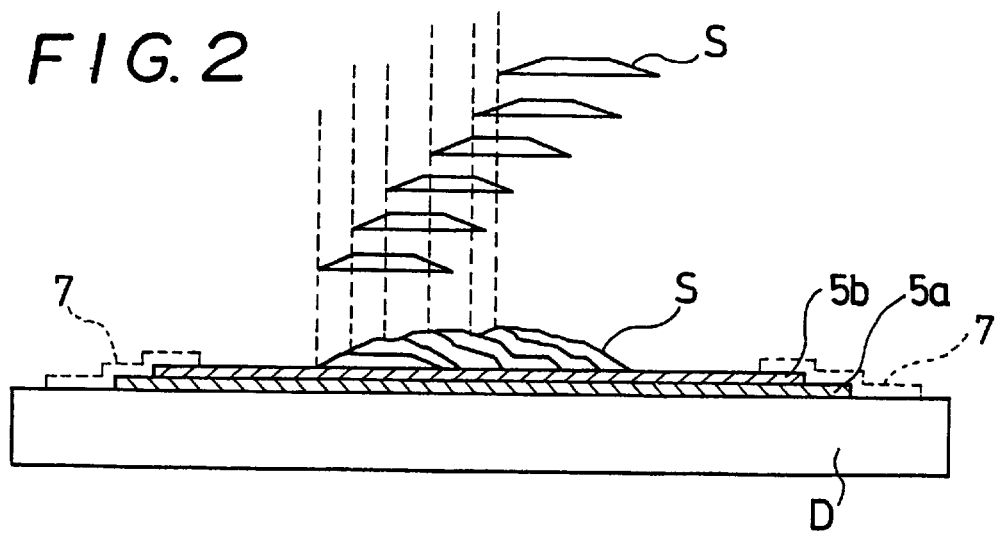
FIG. 2 is a sectional view showing steps of molding a belt/tread laminated member according to a method of fabricating the pneumatic tire for an automobile constituting the embodiment of the invention.

FIG. 2 exemplifies a method of fabricating a pneumatic tire for an automobile according to the embodiment of the invention. As shown by FIG. 2, the belt layers 5a and 5b are made to wrap the outer periphery of an elastic forming drum D such that reinforcement cords intersect with each other between the layers. Further, when providing organic fiber reinforcement layers 7 having a cord angle relative to the tire peripheral direction substantially equal to 0 degree, the organic fiber reinforcement layers 7 are wrapped on outer peripheries of the belt layers 5a and 5b.

Next, by wrapping a strip member S comprising an unvulcanized rubber composition member having a width of 5 through 30 mm and a thickness of 0.5 through 3.0 mm in the tire circumferential direction while overlapping at least a portion thereof at every turn and making kind of the unvulcanized rubber composition member constituting the strip member S differ in accordance with a position of a tire meridian section, there is formed a belt/tread laminated member having the tread portion 4 in a multiple composition structure in which the rubber layer $4b_1$ of the center region and the rubber layer $4b_2$ of the shoulder region of the under tread layer 4b and the cap tread layer 4a are constituted by the rubber composition members which are different from each other as shown in FIG. 1.

As described above, in forming the tread portion 4 having the multiple composition structure, by arbitrarily controlling the overlap amount of the strip member S, the respective layers can be formed in desired sectional shapes. Further, by making the kinds of the rubber composition members constituting the strip member S differ in accordance with the position of the tire meridian section, the tread portion can be formed from a plurality of arbitrarily layers. The strip member S may be formed previously by extrusion or rolling and stocked or may be supplied from an extruder or an injection molder simultaneously with wrapping.

The belt/tread laminated member provided in this way is adhered to an outer peripheral side of a primary green tire to thereby form a secondary green tire and the secondary green tire is vulcanized in a mold to thereby finish fabrication of the tire.

According to the above-described tire fabrication method, in forming the tread portion 4 having the multiple composition structure, the respective rubber layers are formed from the strip member S wound in the tire circumferential direction and therefore, it is not necessary to prepare complicated auxiliary extruding dies for each product. Further, the tread portion having the multiple composition structure is formed from the strip member S on the drum D. Accordingly, there can be avoided a situation in which warp is formed on bottom faces of tread rubber due to difference in shrinkage rates of rubber composition members in cooling process as in the case in which the tread rubber having the multiple composition structure is integrally extruded and in molding a green tire, air storages can be made difficult to cause. Therefore, the pneumatic tire for an automobile having the tread portion 4 in the multiple, composition structure excellent in homogeneous performance can efficiently be fabricated.

According to the invention, dimensions of the strip member S are determined as a width of 5 through 30 mm and a thickness of 0.5 through 3.0 mm. When the dimensions are excessively small, it is difficult to efficiently fabricate tire and conversely, when the dimensions are excessively large, it is difficult to accurately form the tread portion having the multiple composition structure.

EXAMPLE

In pneumatic tires having a tire size of 195/65R15 and having tread portions in a multiple composition structure shown by FIG. 1, under tread layers of tread portions are formed by using strip members having three kinds of rubber composition X, Y and Z shown by Table 1 and there are respectively fabricated an invented tire, a comparative tire and conventional tires 1 and 2 in which the ratio B/A of the width A of the first belt layer to the width B of the center region, the thickness $T_1$ of the center region, the maximum projection amount C from the belt end in the shoulder region and the thickness $T_2$ of the shoulder region are made different variously. Further, the cap tread layer is formed from a rubber composition W of Table 1.

TABLE 1

| | Rubber composition | | | |
|---|---|---|---|---|
| | X | Y | Z | W |
| NR | 70 | 70 | — | — |
| SBR-1[1)] | 15 | 15 | — | — |
| SBR-2[2)] | — | — | 137.5 | 137.5 |
| BR[3)] | 15 | 15 | — | — |
| Carbon black (HAF) | 45 | 60 | — | — |
| (ISAF) | — | — | 100 | 85 |
| Oil | 6 | 6 | 2.5 | 12.5 |
| Zinc oxide | 3 | 3 | 3 | 3 |
| Stearic acid | 2 | 2 | 2 | 2 |
| Ageing preventive agent[4)] | 1 | 1 | 1 | 2 |
| Wax | — | — | — | 2 |
| Vulcanization promotor[5)] | 1 | 1 | 1.3 | 1.5 |
| Sulphur | 2.5 | 2.5 | 1.8 | 2.0 |

TABLE 1-continued

|  | Rubber composition | | | |
| --- | --- | --- | --- | --- |
|  | X | Y | Z | W |
| Total oil amount | 6 | 6 | 40 | 50 |
| JIS-A hardness | 55 | 65 | 75 | 63 |
| tanδ | 0.12 | 0.17 | 0.41 | 0.32 |

In table 1, 1) made by Nippon Zeon Corp., Nipole 1502, 2) made by Nippon Zeon Corp., Nipole 1712 (37.5 phr oil extended), 3) made by Nippon Zeon Corp., Nipole BR1220, 4) N-(1,3-dimethyl butyl)-N'-phenyl-p-phenylene diamine, 5) N-cyclohexyl-2-benzothiazyl sulfenamid With regard to these test tires, the driving stability and the rolling resistance are evaluated by the following method and the result is shown by Table 2.

Driving Stability:

Constant load is applied on a tire disposed on a rotatable flat belt with a slip angle of 1 degree, reaction, force to the tire thereby is formed into a numerical value and cornering power (CP) is measured. A result of evaluation is indicated by an index value with a measured value of Conventional tire 1 as 100. The larger the index value. the more excellent is the driving stability.

Rolling Resistance:

Constant load is applied on a tire disposed on a rotating drum and rolling resistance at a driving speed of 40 through 150 km/h is measured. As a result of evaluation, an inverse number of a measured value is used and the result of evaluation is indicated by an index value with an inverse number of a measured value of Conventional tire 1 as 100. The index value signifies that the larger the index value, the smaller the rolling resistance.

TABLE 2

|  |  | Conventional tire 1 | Conventional tire 2 | Comparative tire | Invented tire |
| --- | --- | --- | --- | --- | --- |
| Kind of rubber | Center region | X(55) | Z(75) | Z(75) | Z(75) |
| (hardness) | Shoulder region | X(55) | Z(75) | Y(65) | Y(65) |
| Ratio B/A |  | 0.4 | 0.4 | 0.2 | 0.6 |
| Center region thickness $T_1$ (mm) |  | 1.5 | 1.5 | 1.5 | 1.5 |
| Shoulder region thickness $T_2$ (mm) |  | 1.5 | 1.5 | 0.5 | 4.0 |
| Maximum projection amount C (mm) |  | 20 | 20 | 20 | 20 |
| Driving stability |  | 100 | 112 | 105 | 110 |
| Rolling resistance |  | 100 | 90 | 95 | 102 |

As shown by Table 2, according to the invented tire, while maintaining the rolling resistance at a level the same as that of Conventional tire 1 in which the under tread layer is mainly constituted by low heat generation rubber, the driving stability can be promoted to a level the same as that of Conventional tire 2 in which the under tread layer is constituted mainly by rubber having high hardness. Meanwhile, although Comparative tire uses a rubber composition member the same as that of Invented tire at the under tread layer, the effect of reducing the rolling resistance and the effect of promoting the driving stability are insufficient since a region arranged therewith is not proper.

What is claimed is:

1. A pneumatic tire for an automobile in which two layers of belt layers including a first belt layer on a side of the carcass layer and a second belt layer on an outer peripheral side thereof are arranged on an outer peripheral side of the carcass layer in a tread portion and the tread portion comprises a two-layered structure of a cap tread layer and an under tread layer:

wherein the under tread layer comprises:
 a center region defined by a range of 30 through 70% of a width of the first belt layer centering on a tire equator and a range of 0.5 through 2.0 mm as a center region thickness $T_1$ in a tire diameter direction from the second belt layer; and
 shoulder regions each of which are defined by a region between the center region and an outer side, a range of 1.0 through 5.0 mm as a shoulder region thickness $T_2$ thereof and a distance between an end portion of the first belt layer and the outer side being 30 mm at a maximum, said center region and said shoulder regions comprising rubber composition members different from each other;
wherein the center region is arranged with a rubber layer having a blending system in which JIS-A hardness falls in a range of 65 through 80 and an amount of blending a softening agent relative to rubber 100 weight parts is smaller than a blending amount thereof of the cap tread layer by 10 weight parts or higher, the shoulder region is arranged with a rubber layer having a blending system in which the JIS-A hardness falls in a range of 50 through 70 and an amount of blending a softening agent relative to the rubber 100 weight parts is smaller than the blending amount of the cap tread layer by 10 weight parts or higher and a ratio (tan $\delta_2$/tan $\delta_1$) of loss tangent (tan $\delta_2$) of the rubber layer of the shoulder regions to loss tangent (tan $\delta_1$) of the rubber layer of the center region is ⅔ or lower, and
wherein the shoulder region thickness $T_2$ is larger than the center region thickness $T_1$.

2. The pneumatic tire for an automobile according to claim 1:
wherein the cap tread layer is arranged with a rubber layer having a blending system in which the JIS-A hardness falls in a range of 45 through 75 and the amount of blending the softening agent relative to the rubber 100 weight parts is 10 through 60 weight parts.

3. A method of fabricating a pneumatic tire for an automobile, comprising the steps of:
wrapping belt layers on an outer periphery of a forming drum; and
wrapping a strip member comprising an unvulcanized rubber composition member having a width of 5 through 30 mm and a thickness of 0.5 through 3.0 mm on an outer peripheral side of the belt layers in a tire circumferential direction while overlapping at least a portion thereof at every turn;
arranging two layers of the belt layers including a first belt layer on a side of a carcass layer and a second layer on an outer peripheral side thereof on an outer side of the carcass layer in the tread portion and constituting the tread portion in a two-layered structure of a cap tread layer and an under tread layer;

constituting the under tread layer by a center region defined by a range of 30 through 70% of a width of the first belt layer centering on a tire equator and a range of 0.5 through 2.0 mm as a center region thickness $T_1$ from the second belt layer in a tire diameter direction and shoulder regions each of which are defined by a region between the center region and an outer side, a range of 1.0 through 5.0 mm as a shoulder region thickness $T_2$ thereof and a distance between an end portion of the first belt layer and the outer side being 30 mm at a maximum, said center region and said shoulder regions comprising rubber composition members different from each other;

arranging at the center region a rubber layer having a blending system in which JIS-A hardness falls in a range of 65 through 80 and an amount of blending a softening member relative to rubber 100 weight parts is smaller than a blending amount thereof of the cap tread layer by 10 weight parts or more; and arranging art the shoulder regions a rubber layer having a blending system in which the JIS-A hardess falls in a range of 50 through 70 and an amount of blending a softening agent relative to the rubber 100 weight parts is smaller than a blending amount thereof of the cap tread layer by 10 weight parts of more;

wherein a kind of the unvulcanized rubber composition constituting the strip member is made to differ in accordance with a position of a tire meridian section to thereby form a tread portion having a multiple composition structure;

wherein a ratio (tan $\delta_2$/tan $\delta_1$) of loss tangent (tan $\delta_2$) of the rubber layer of the shoulder regions to loss tangent (tan $\delta_1$) of the rubber layer of the center region is ⅔ or smaller;

wherein the kind of the unvulcanized rubber composition constituting the strip member is made to differ in accordance with positions of the cap tread layer and the under tread layer to thereby form the tread portion having a multiple composition structure; and wherein the shoulder region thickness $T_2$ is larger than the center region thickness $T_1$.

4. The method of fabricating a pneumatic tire for an automobile according to claim 3:

wherein the cap tread layer is arranged with a rubber layer having a blending system in which the JIS-A hardness falls in a range of 45 through 75 and an amount of blending the softening agent relative to rubber 100 weight parts falls in a range of 10 through 60 weight parts.

5. The method of fabricating a pneumatic tire for an automobile according to claim 3:

wherein the strip member comprising the unvulcanized rubber composition, member is supplied from an extruder.

6. The method of fabricating a pneumatic tire for an automobile according to claim 3:

wherein the strip member comprising the unvulcanized composition member is supplied from an injection molder.

7. The method of fabricating a pneumatic tire for an automobile according to claim 3, further comprising the step of:

wrapping organic fiber reinforcement layers having a cord angle relative to the tire circumferential direction substantially equal to 0 degree on outer peripheries of the belt layers and wrapping the strip member on the organic fiber reinforcement layers.

* * * * *